US010692149B1

(12) United States Patent
Loo et al.

(10) Patent No.: US 10,692,149 B1
(45) Date of Patent: Jun. 23, 2020

(54) EVENT BASED INSURANCE MODEL

(71) Applicant: Allstate Insurance Company, Northbrook, IL (US)

(72) Inventors: William Loo, Arlington Heights, IL (US); Jennifer A. Brandmaier, Chicago, IL (US); Philip Peter Ramirez, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 244 days.

(21) Appl. No.: 14/098,874

(22) Filed: Dec. 6, 2013

(51) Int. Cl.
*G06Q 40/00* (2012.01)
*G06Q 40/08* (2012.01)

(52) U.S. Cl.
CPC .................... *G06Q 40/08* (2013.01)

(58) Field of Classification Search
CPC ....................................... G06Q 40/00
USPC .......................... 705/35, 4, 14.53
See application file for complete search history.

(56) References Cited

U.S. PATENT DOCUMENTS

| 7,286,825 | B2 | 10/2007 | Shishido et al. |
| 8,139,109 | B2 | 3/2012 | Schmiedel et al. |
| 8,332,242 | B1 | 12/2012 | Medina, III |
| 8,458,315 | B2 | 6/2013 | Miche et al. |
| 2007/0268158 | A1 | 11/2007 | Gunderson et al. |
| 2008/0059007 | A1 | 3/2008 | Whittaker et al. |
| 2009/0024419 | A1 | 1/2009 | McClellan et al. |
| 2009/0109037 | A1* | 4/2009 | Farmer ................ G06Q 20/102 340/576 |
| 2009/0210257 | A1 | 8/2009 | Chalfant et al. |
| 2009/0254241 | A1 | 10/2009 | Basir |
| 2009/0313121 | A1* | 12/2009 | Post ................... G06Q 30/0255 705/14.53 |
| 2010/0131300 | A1 | 5/2010 | Collopy et al. |
| 2010/0205012 | A1 | 8/2010 | McClellan |
| 2011/0137687 | A1 | 6/2011 | Duddle et al. |

(Continued)

FOREIGN PATENT DOCUMENTS

| WO | 94/11853 A1 | 5/1994 |
| WO | 2006131929 A2 | 12/2006 |

OTHER PUBLICATIONS

"Dodge Grand Caravan Car Insurance"; http://www.allstate.com/auto-insurance/cars-trucks/Dodge/Grand-Caravan-car-insurance.aspx (last visited Oct. 17, 2013).

(Continued)

*Primary Examiner* — Ojo O Oyebisi
(74) *Attorney, Agent, or Firm* — Banner & Witcoff, Ltd.

(57) ABSTRACT

Methods, computer-readable media, software, and apparatuses provide a system for providing an event based insurance model in which insurance rates are adjusted based on events occurring during a drive. The system may include computing devices in one or more vehicles or in a cloud. Using such computing devices, the system may provide recommendations to drivers based on their surroundings. In particular, the system may identify individuals, such as passengers and other drivers, in proximity to a particular vehicle and provide recommendations to the driver of that vehicle when such individuals might negatively influence the driver's performance or otherwise be a danger to the driver. The system may also monitor the driver's reactions to recommendations and determine adjustments to insurance rates based on such reactions.

22 Claims, 5 Drawing Sheets

(56) References Cited

U.S. PATENT DOCUMENTS

2013/0041547 A1 2/2013 Goodermuth et al.
2013/0046559 A1 2/2013 Coleman et al.
2013/0151288 A1 6/2013 Bowne et al.
2013/0166324 A1 6/2013 Lally

OTHER PUBLICATIONS

"Vehicle Safety Communications in the United States"; http://www-nrd.nhtsa.dot.gov/pdf/esv/esv20/07-0010-O.pdf (last visited Oct. 17, 2013).
"How much would car insurance cost for a Dodge Caravan"; http://www.carinsurancecomparison.com/how-much-would-car-insurance-cost-for-a-dodge-caravan/ (last visited Oct. 17, 2013).
Vlad Coroama et al., "Personalized Vehicle Insurance Rates"; "A Case for Client-side Peronalization in Ubiquitous Computing"; Institute for Pervasive Computing; ETH Zurich; http://www.vs.inf.ethz.ch/publ/papers/coroama-langheinrich_2006_client-side-pers.pdf (last visited Oct. 17, 2013).
Vincent Baines et al., "Communication and metrics in agent convoy organization"; Dept. of Computer Science, University of Bath; pp. 1-9; {v.f.baines,j.a.padget}@bath.ac.uk.
"A European project invents a self driven car convoy"; Cleantech Republic; http://www.cleantechrepublic.net/2011/07/07/a-european-project-invents-a-self-driven-car-convoy/.
Yuichi Shiraki et al., "Developoment of an Inter-Vehicle Communications Systems"; OKI Technical Review 187; Sep. 2001; vol. 68, pp. 11-13.

\* cited by examiner

EVENT BASED INSURANCE MODEL

FIELD OF ART

Aspects of the disclosure generally relate to methods and computer systems, including one or more computers particularly configured and/or executing computer software. Specifically, aspects of this disclosure provide a system for collecting information about environmental influences on driver performance, and generating and modifying event based insurance rates, and more particularly, insurance rates for drivers based on who they drive with or near and how they react to recommended actions.

BACKGROUND

Much research has been done to study social behavior. It has been asserted that some people change their behavior based on their surroundings, and in particular based on who surrounds them and how they are behaving. Meanwhile, studies have also been performed to determine which groups of people are more likely to be involved in an accident and/or responsible for an accident. Demographic information is commonly used by insurance companies to determine appropriate insurance rates for drivers. More recently, insurance companies have also collected drive data (or attempted to collect drive data) to evaluate driver performance for the purpose of determining rates. Insurance companies hope that tying insurance rates to driver performance will incentivize good driving behavior, and thus, presumably reduce risk of liability. Still, not all drivers may be motivated enough to improve their driving performance and some drivers might not be aware of what is causing their poor performance. Thus, insurance companies continue to search for new ways to facilitate good driving behavior and reduce risk of liability.

Accordingly, new systems, devices, methodologies, and software are desired to account for the phenomenon that surroundings, including passengers and nearby drivers, influence driving behavior when generating insurance rates, and to incentivize drivers to drive safely.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure describe methods, computer readable storage media, software, systems, and apparatuses for implementing and executing processes of an event management system that carries out an event based insurance model in which insurance rates are adjusted based on events occurring during a drive. The event management system may facilitate providing recommendations to drivers based on their surroundings and determining adjustments to insurance rates based on driver reactions to the recommendations. The event management system may incentivize safe driving behavior by lowering insurance rates and may reduce the risk of driving accidents, and thus liability, by educating drivers about the impact their surroundings (including passengers and nearby drivers) might have on their driving performance. Aspects of the disclosure may be used in a variety of applications, including organizing and managing a caravan of vehicles or organizing and managing a car pool.

Aspects of this disclosure provide a system comprising first and second computing devices. The first computing device may be a vehicle computing device installed in a vehicle or a mobile computing device (e.g., a smartphone, tablet, laptop, etc.) in the vehicle. Meanwhile, the second computing device may be in the vehicle or connected to a device in the vehicle via a network (e.g., the second computing device may be a server in the "cloud"). The second computing device may be configured to provide a recommendation to a driver of the vehicle via the first computing device (e.g., a server may send a recommendation to a computing device in the vehicle which may display the recommendation on a screen installed in the dashboard of the vehicle or output an audio message through speakers of the vehicle). The second computing device may also be configured to determine a reaction of the first driver to the recommendation. For example, the second computing device may determine whether the vehicle slowed down, maintained a distance from another vehicle, changed lanes to let another vehicle pass, etc. The second computing device may further be configured to determine an adjustment to an insurance payment based on the reaction of the driver to the recommendation. For example, the second computing device may determine to apply a discount or credit to the driver's account if the driver follows the recommended course of action (e.g., slows the vehicle down if the recommendation is to drive slowly). The second computing device may also be configured to identify a characteristic of an environment surrounding the vehicle. For example, the second computing device may identify whether the vehicle is surrounded by traffic, whether the vehicle is in bad weather, whether the vehicle is at a dangerous section of a road, etc. In particular, the second computing device may identify people in the environment surrounding the vehicle and evaluate possible effects they might have on the risk of an accident involving the vehicle. For example, the second computing device may determine whether the vehicle is around other dangerous drivers or whether the vehicle contains passengers who may negatively influence the driver (e.g., distract drivers or encourage drivers to drive fast or reckless). The second computing device may use such information to determine whether a recommendation should be provided to the driver, and if so, what the recommendation should be. In some examples, the recommendation may be an alert or warning that informs the driver of a passenger that might have a negative impact on the driver's driving performance. Additionally, or alternatively, the recommendation may provide a recommended (or suggested) action, such as a suggestion to reduce speed, change lanes, change routes (e.g., use alternate roads to reach a destination and avoid certain drivers or conditions), stay away from another vehicle, etc.

The system may also include a third computing device (e.g., another vehicle computing device, driver computing device, or passenger computing device) in a second vehicle. The third computing device may communicate with the first computing device via various protocols (e.g., WiFi Direct). Either one of the first computing device and the second computing device may be configured to determine a second driver of the second vehicle, and to determine whether the second driver should be avoided. If the second driver is to be avoided, the recommendation provided to the driver may include a description of the second driver or the second vehicle to be avoided and/or a suggested action to take to avoid the second driver.

During the trip, the system may collect drive data of the vehicle and monitor changes to the vehicle's surroundings (e.g., changes in weather, traffic conditions, passengers, and nearby drivers). For example, the system may detect other drivers to avoid as other vehicles enter the proximity of the vehicle. Accordingly, the system may provide updated recommendations throughout a trip and monitor reactions to such recommendations. In some cases, the system may also report results during the drive so that the driver may receive more timely feedback, which may help to educate and motivate the driver so the driver may execute safe driving behavior.

Aspects of the disclosure also provide the computing devices of the system as well as the computer readable media of those computing devices that store an event management program. Specifically, aspects of the disclosure provide a computing device, comprising a network interface configured to communicate with one or more additional computing devices and a processor. The processor may be configured to provide a recommendation to one of the one or more additional computing devices in a first vehicle; determine a reaction of a first driver of the first vehicle to the recommendation; and determine an adjustment to an insurance payment (e.g., an insurance premium paid semi-annually) based on the reaction of the first driver to the recommendation. The network interface may be configured to receive drive data of the first vehicle from one of the one or more additional computing devices. The processor may use this drive data to determine the reaction of the driver of the first vehicle. For example, if the drive data indicates that the first vehicle decelerated, the processor may determine that the driver followed a recommendation to slow down. In some examples, the processor may access, read, and write data to a particular memory device. Meanwhile, the memory device may store computer-executable instructions of an event management program.

Aspects of the disclosure further provide a method for executing an event based insurance model. For example, aspects provide a method of adjusting insurance payments of drivers based on their reaction to recommendations, which are generated in light of their surroundings. The method may comprise configuring a computing device with an event manager (e.g., installing a program on the computing device) and registering the computing device with an event management system. The method may also comprise identifying a characteristic (e.g., weather, people, etc.) of an environment surrounding a vehicle; providing a recommendation to a driver of the vehicle (e.g., causing the driver's smartphone to play an audio message including a recommendation, causing a vehicle computing device in the vehicle to display a recommendation on a screen installed in the vehicle, etc.); determining a reaction of the driver to the recommendation based on drive data (e.g., vehicle telematics data) collected by the computing device; and determining an adjustment to an insurance payment based on the reaction of the driver to the recommendation. In an example of this method, identifying the characteristic of the environment surrounding the vehicle may include identifying a person within a predetermined range of the vehicle. Also, providing the recommendation may include determining whether the identified person is a passenger that is expected to have a negative influence on the driver or whether the identified person is a nearby driver that is deemed dangerous (e.g., has shown and/or currently is showing tendencies to be a reckless or fast driver).

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited in the accompanying figures in which like reference numerals indicate similar elements and in which.

DETAILED DESCRIPTION

In accordance with various aspects of the disclosure, methods, computer-readable media, software, and apparatuses are disclosed that provide an event based insurance model to account for the effects surroundings, and in particular people, have on a driver. Today, auto-insurance is typically provided on a term basis (e.g., monthly, yearly, etc.). For example, auto-insurance companies typically provide insurance coverage for a year in exchange for a fixed premium, which may be spread across semi-annual, quarterly, or monthly payments. However, an event based insurance model may be implemented to better incentivize users to drive safely. Aspects of this disclosure may facilitate implementation of this model. Specifically, event based insurance models may be implemented and managed by an event management system disclosed herein. The event management system may include a number of devices, such as computing devices installed in vehicles, user devices (e.g., smartphones), and cloud computing devices (e.g., servers). Part of the event management system may include one or more cloud computing devices that are owned and/or operated by one or more insurance companies. The event management system may provide an insurance company with access to users (e.g., customers and/or those in proximity to customers) so that the insurance company can collect data, suggest recommended courses of action (e.g., safe driving behavior), and adjust insurance rates based on user responses. In particular, the event management system facilitates the collection of who is in the vehicle with a driver (e.g., passengers) or in vehicles near the driver's vehicle (e.g., in other vehicles participating in a caravan with the driver's vehicle), so that an insurance company may track user behavior and adjust insurance rates accordingly.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made. Furthermore, the disclosure of the following patent applications are incorporated by reference herein in their entirety: U.S. patent application Ser. No. 13/216,849, filed Aug. 24, 2011 and entitled "In Vehicle Driver Feedback Device;" U.S. patent application Ser. No. 14/055,198, filed Oct. 16, 2013 and entitled "Caravan Management;" and U.S. patent application Ser. No. 14/098,165, filed Dec. 5, 2013 and entitled "Usage Based Insurance Model."

Figure 1:
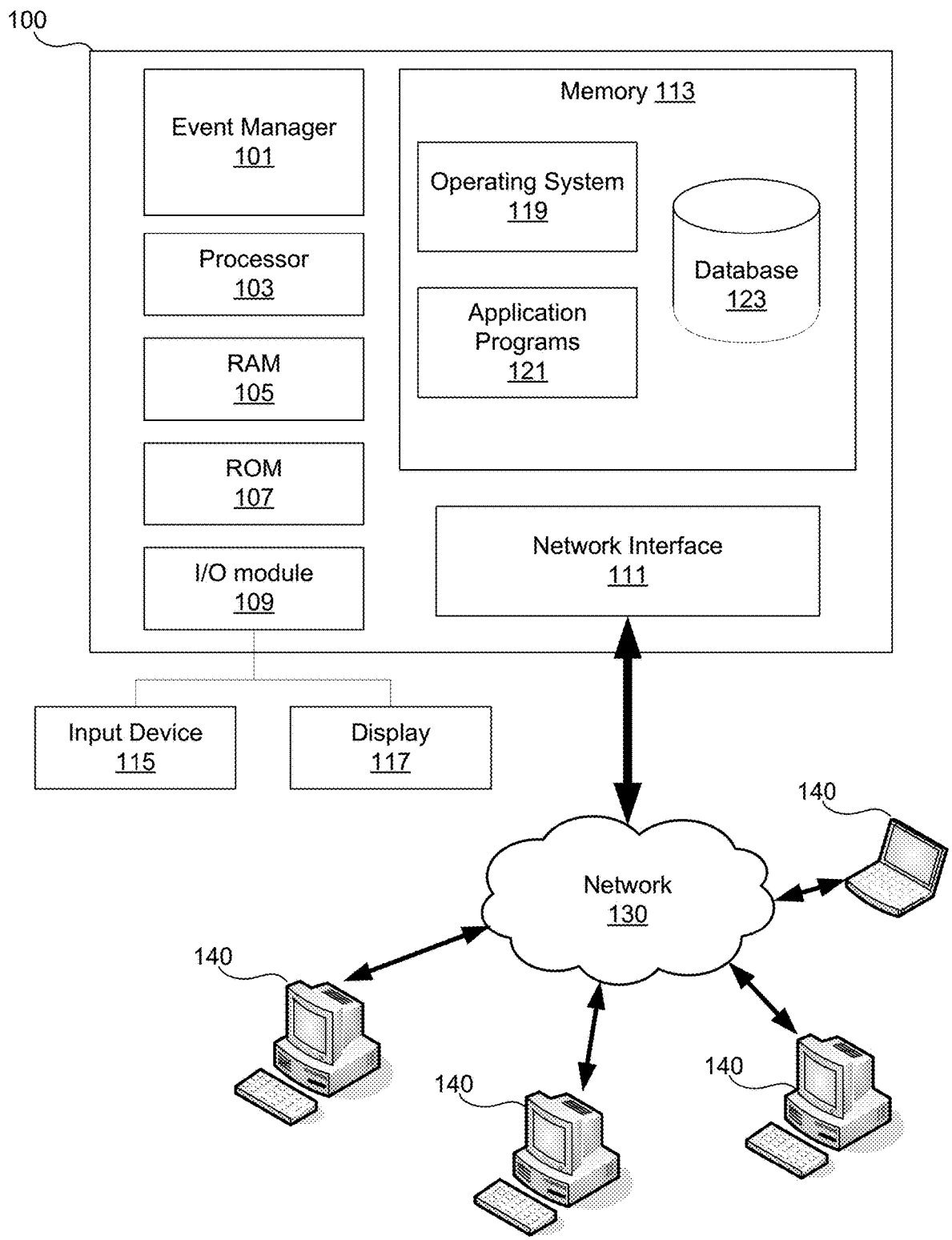
FIG. 1 is a block diagram of an example computing device that may be used according to an illustrative embodiment of the present disclosure.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have an event manager 101 for performing methods and executing instructions of an event management program described herein to provide the event management system configured to manage even based insurance for one or more drivers. The event manager 101 may be implemented with one or more processors and one or more storage units (e.g., databases, RAM, ROM, and other computer-readable media), one or more application specific integrated circuits (ASICs), and/or other hardware components. Throughout this disclosure, the event manager 101 may refer to the software and/or hardware used to implement the event manager 101. The one or more processors of the event manager 101 may operate in addition to or in conjunction with another general processor 103 of the computing device 100. Both the event manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the event management program, such as rules for identifying people near a driver (e.g., passengers and other drivers), calculating scores, generating recommendations, recording reactions, and adjusting insurance rates, described in further detail below. On some computing devices 100, the input device 115 may be operated by users to interact with the event management program, including providing user information and/or preferences, identifying passengers and/or other drivers (e.g., in a caravan), responding to recommendations, reviewing drive data, etc., as described in further detail below. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example embodiment of a computing device 100. In other embodiments, the computing device 100 may include fewer or more elements. For example, the computing device 100 might not include the processor 103 in addition to one or more processors of the event manager 101. On the other hand, the computing device 100 may be a mobile device (e.g., a smartphone, tablet, etc.), and thus, may also include various other components, such as a battery, speaker, and/or antennas (not shown). Also, the computing device 100 may be a vehicle computing device (either installed by a vehicle manufacturer or as an aftermarket part) having vehicle compatible elements, such as a port for an on-board diagnostic connector or ports for other vehicle sensors (e.g., tire pressure sensors, engine temperature sensors, etc.).

Figure 2:
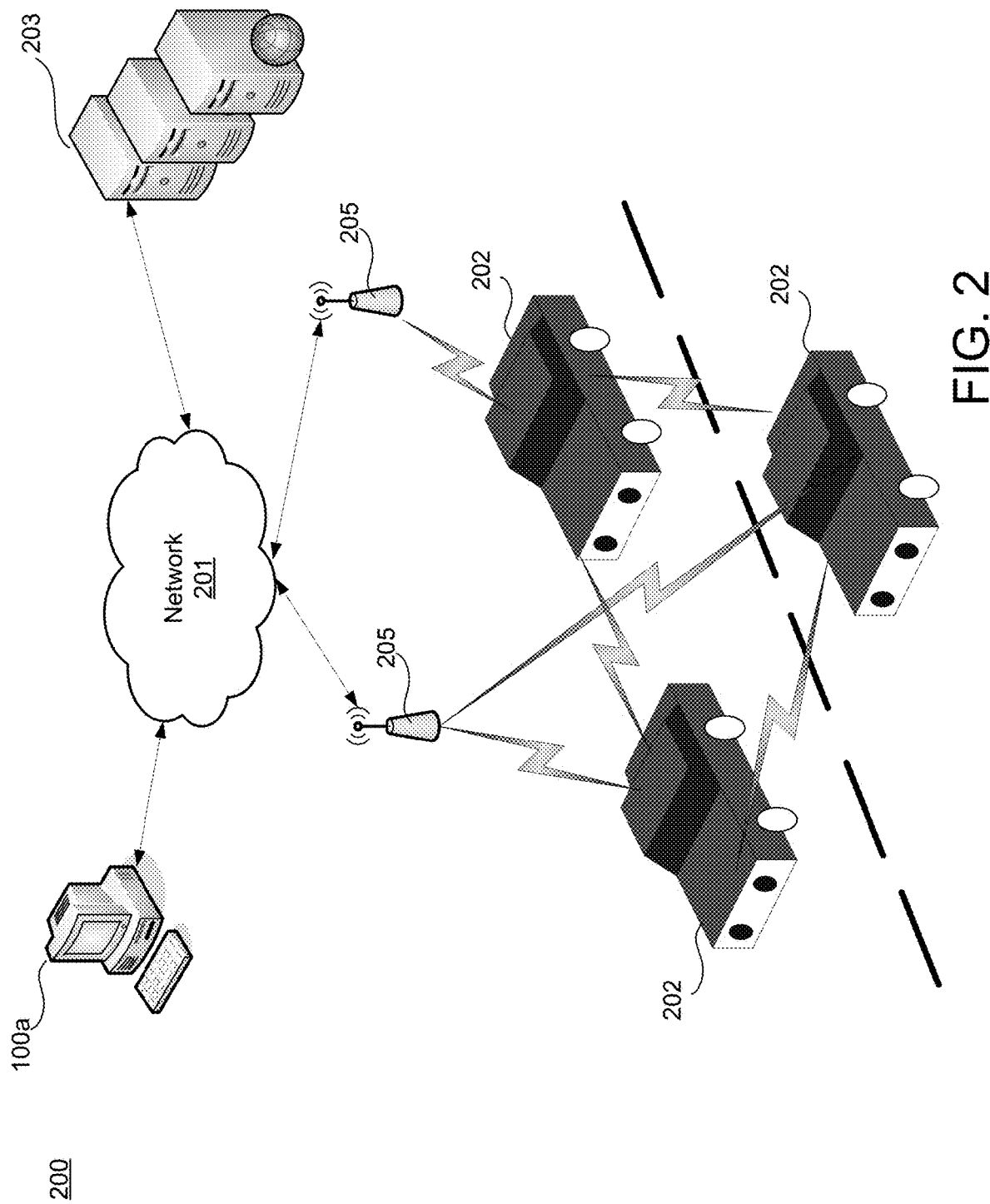
FIG. 2 illustrates an example network environment in which a system in accordance with the present disclosure may be implemented.

The methods and software for carrying out an event based insurance model disclosed herein may be implemented on one or more computing devices 100 used in various network environments. FIG. 2 illustrates an example network environment 200 for implementing methods according to the present disclosure. As shown in FIG. 2, the network environment 200 may include a network 201 configured to connect computing devices (not shown in FIG. 2) within vehicles 202, one or more administrative computing devices 100a, and one or more application servers 203. Collectively, these computing devices may form an event management system. The network 201 may be any type of network, like the network 130 described above, and use one or more communication protocols (e.g., protocols for Bluetooth, cellular communications, satellite communications, etc.) to connect computing devices and servers within the network environment 200. In particular, the network 201 may include a cellular network and its components, such as base stations, cell towers, etc. The network environment 200 may include access points 205 to extend the network 201 to reach mobile computing devices, such as personal smartphones and vehicle computing devices. The access points 205 may include cellular network components (e.g., cell towers, base stations, etc.), global positions system components (e.g., antennas, satellites, etc.), and other wireless access components (e.g., routers). As shown in FIG. 2, the access points 205 may allow computing devices within vehicles 202 to communicate with the one or more administrative computing devices 100a, application servers 203, and computing devices within other vehicles 202. As such, through the network 201, the computing devices within the vehicles 202 may obtain a variety of information, including map data, traffic information, weather information, etc., and may send drive data, passenger information, information regarding nearby drivers, etc. to other devices on the network 201 for remote storage and/or processing. While the disclosure may focus on connecting the computing devices within vehicles 202 to the network 201, it should be understood that these same computing devices may connect to the network 201 even if they are removed from the vehicles 202.

Additionally, FIG. 2 illustrates a plurality of vehicles 202. Although FIG. 2 shows each of the vehicles 202 as being a car, the vehicles 202 may be a motorcycle, bicycle, scooter, drone (or other automated device), truck, bus, boat, plane, etc. FIG. 2 further illustrates that the vehicles 202 may directly communicate with one another. For example, a vehicle computing device and/or a user computing device in one vehicle 202 may communicate directly (e.g., over radio waves or via a wireless local area network (WLAN)) with a vehicle computing device and/or user computing device in another vehicle 202 within a certain proximity (e.g., 100 meters, 200 meters, etc.). An event management program executing on the different computing devices may function to choose and tune devices to particular communication frequencies. In some cases, the event management program may also implement security features (e.g., distribute encryption keys for encryption) to create secure communication paths. While three vehicles 202 are specifically shown in FIG. 2, fewer or more vehicles 202 may be connected to one another.

Although computing devices in different vehicles may communicate directly, they may also communicate through the network 201. For example, a vehicle computing device and/or a user computing device in one vehicle 202 may indirectly communicate via a cellular backhaul with a vehicle computing device and/or user computing device in another nearby vehicle 202. The caravan management program executing on the different computing devices may function to set up cellular calls, satellite calls, short message system (SMS) messages, and/or other means for exchanging information over a wireless communication system (e.g., a cellular backhaul). In some embodiments, instead of directing information to another computing device, each computing device may direct information to an administrative computing device 100a or an application server 203. The administrative computing device 100a or application server 203 may collect all information which then can be either pulled by other computing devices upon request or automatically pushed to the other devices within a certain proximity to the vehicle 202 that provided the information. For example, one computing device in a first vehicle 202 may send information to an application server 203, and another computing device in a second vehicle 202, within 250 meters of the first vehicle, may pull the information from the application server 203 so that essentially the computing devices in different vehicles 202 can communicate with one another.

In some embodiments, one or more of the application servers 203 may be configured to provide a service that receives trip data from drivers so that drivers, insurers, or others can review the trip data. For example, an application server 203 may host a website that users can visit to see how well they performed during past trips and other details regarding past trips (e.g., who were the passengers, who was being followed, who was following the driver, etc.). Insurers may also access the application server 203 to evaluate how well their customers drive, who their customers drive with, and how those people affect their customer's driving behavior. In some examples, the application server 203 may aggregate trip data for a number of trips with similar (e.g., one or more people in common) passengers or nearby drivers. The application server 203 may also provide a webpage containing a leaderboard that ranks drivers, and showing past insurance rate adjustments for the different trips the driver made and who was a passenger during the trip or who was a nearby driver. By showing the past insurance rate adjustments and surrounding people, drivers may be incentivized to drive more safely to bring down their insurance rates and may learn about changes in their driving behavior. It is contemplated that by educating drivers about how they drive when around certain people, the event management system may help users to correct their driving behavior.

In some embodiments, one or more of the application servers 203 may be dedicated to a particular geographical area for storing and sharing information with drivers regarding the geographical area (e.g., city, town, state, etc.). For example, an application server 203 may provide information to a vehicle (or computing device therein) informing the driver that he/she is entering a construction zone or about to hit traffic within the geographical location. In some cases, the event management system may use such information to suggest actions and offer insurance rate adjustments to drivers if they follow such suggestions and avoid problem areas.

Still referring to FIG. 2, the administrative computing device 100a may be configured to generate, edit, manage, and deliver the event management program. The event management program may be downloaded, installed, and executed on one or more mobile computing devices, such as user computing devices (e.g., smartphones) and vehicle computing devices (not shown in FIG. 2), within the vehicles 202. In some examples, the administrative computing device 100a may execute the event management program in tandem with a user computing device and/or vehicle computing device. The administrative computing device 100a may, for example, render graphics (e.g., screens for display by an event management program executing on a mobile computing device) and/or webpages which are then streamed to the mobile computing devices within the vehicles 202. Meanwhile, the mobile computing devices within the vehicles 202 may be used to supply user inputs so that the user may interact with the caravan management program.

Figure 3:
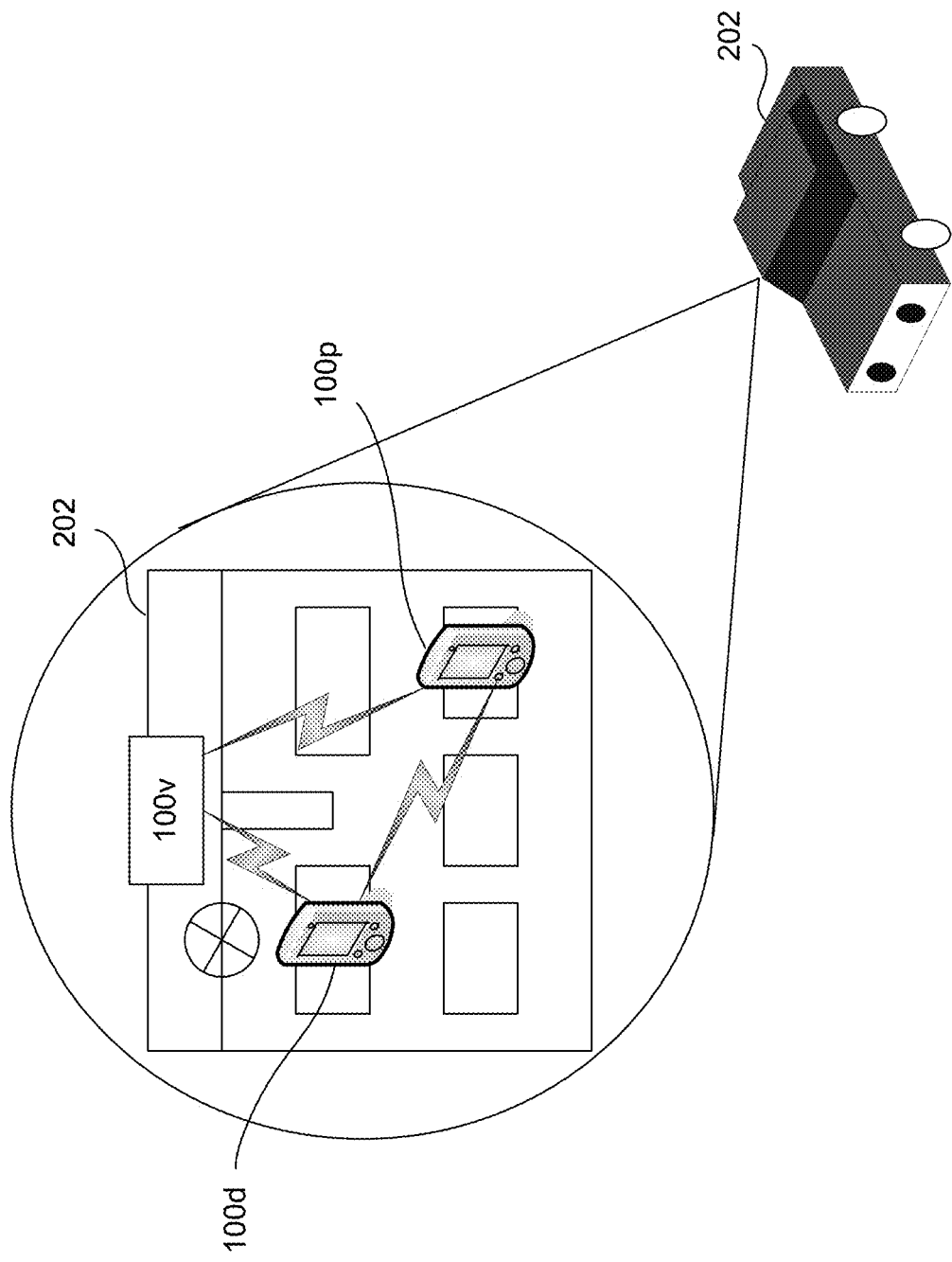
FIG. 3 illustrates an example subsystem for implementing aspects of the present disclosure.

FIG. 3 illustrates an example subsystem within the network environment 200. Specifically, FIG. 3 illustrates an example arrangement of mobile computing devices that may exist within one of the vehicles 202 of FIG. 2. FIG. 3 includes an inside view of a vehicle 202 to illustrate example operating positions and lines of communication of the various mobile computing devices present within the vehicle 202. As shown in FIG. 3, a driver computing device 100d, a passenger computing device 100p, and a vehicle computing device 100v may communicate with one another. The driver computing device 100d may be any mobile computing device (e.g., a smartphone, tablet, etc.) that is associated with a driver of the vehicle 202. Meanwhile, a passenger computing device 100p may be any mobile computing device (e.g., a smartphone, tablet, etc.) that is associated with a passenger of the vehicle 202. The driver and passengers of a vehicle 202 may change, and thus, so may the status of their mobile computing devices. As a person's status as a driver or passenger changes, the status (or mode) of their mobile computing devices as a driving computing device 100d or passenger computing device 100p may change as well. For example, when a person is driving a vehicle 202, his/her mobile computing device may be considered a driver computing device 100d. But, if he/she becomes a passenger, his/her mobile computing device may be considered a passenger computing device 100p. Whether a user device is a driver computing device 100d or passenger computing device 100p may be determined by querying the user of the device. Alternatively, the user device may determine its position within a vehicle (e.g., whether it is in the driver seat, front passenger seat, or rear seat) to determine whether the status of the user device is a driver computing device 100d or passenger computing device 100p.

Discerning driver computing devices 100d from passenger computing devices 100p may be useful to track who is influencing who (e.g., which passengers are influencing which drivers). In some embodiments, whether a user device is a driver computing device 100d or a passenger computing device 100p may affect what functions the user device performs. For example, the driver computing device 100d might not allow text messages or phone calls to be made during a trip, and may instead use driver preferences as driver inputs. Also, the driver computing device 100d may collect drive data using, e.g., its accelerometer, while the passenger computing device 100p might not be used to collect such drive data.

Although FIG. 3 depicts just one passenger computing device 100p, the vehicle 202 may carry a plurality of passengers each associated with a separate passenger computing device 100p. In some embodiments, two or more passengers may share a passenger computing device 100p. Also, although FIG. 3 depicts one driver computing device 100d, where the vehicle is operated by more than one driver, there may be multiple driver computing devices 100d. Moreover, if the vehicle is autonomous, there might not be any driver computing devices 100d. Further, in some embodiments, the vehicle computing device 100v may operate as one, or both, of a driving computing device 100d and a passenger computing device 100p. For example, a driver and passenger may take turns inputting information through the vehicle computing device 100v, such that the vehicle computing device 100v is associated with multiple people, and thus, serves as both a driver computing device 100d and passenger computing device 100p.

The vehicle computing device 100v may include the vehicle's on-board diagnostic (OBD) system. The vehicle computing device 100v may be configured to interface with one or more vehicle sensors (e.g., sensors for detecting distance between a vehicle and other objects, image sensors, fuel gauge, tire pressure sensors, engine temperature sensors, etc.). The vehicle computing device 100v may also interface with the driver computing device 100d and/or passenger computing device 100p via a wired connection (e.g., USB, OBD II connector, etc.) or a wireless connection (e.g., Bluetooth). In some embodiments, there might not be a vehicle computing device 100v installed in the vehicle 202 that is configurable to participate in the event management system, or the vehicle computing device 100v might not be able to communicate with any of the mobile computing devices (e.g., driver computing device 100d or passenger computing device 100p). Still, in some cases, the vehicle computing device 100v might be configured so that it only communicates with a subset of the mobile computing devices within the same vehicle 202.

In some embodiments, one or more of the vehicles 202 may be autonomous or in an autonomous mode (e.g., auto-pilot mode). An autonomously controlled vehicle 202 may be controlled by its vehicle computing device 100v and/or a remote computing device (e.g., administrative computing device 100a). The vehicle computing device 100v may employ sensors for inputting information related to a vehicle's 202 surroundings (e.g., distance from nearby objects) and use the inputted information to control components of the vehicle 202 to steer the vehicle 202. The vehicle computing device 100v may use information from other nearby vehicles to control the vehicle 202 to automatically react to surroundings so as to avoid an accident. For example, the vehicle computing device 100v may automatically steer a vehicle 202 away from a nearby vehicle if that nearby vehicle is being operated by a risky driver.

In light of FIGS. 2 and 3, it should be understood that a number of communication paths are disclosed. Any one of the driver computing device 100d, passenger computing device 100p, and vehicle computing device 100v in one vehicle 202 may communicate with any one of such devices in another vehicle 202 within a certain distance (which may vary in different embodiments or even dynamically change, e.g., based on traffic). Various communication protocols may be used between the various computing devices 100 within a vehicle 202. Moreover, a computing device 100 may use one protocol (e.g., Bluetooth) to communicate with other devices in the same vehicle 202, and use a separate protocol (e.g., a satellite protocol) to communicate with devices in separate vehicles. In some examples, WiFi Direct may be used for direct communications between devices within a particular range. In such examples, the device in the WiFi Direct network having the fastest or most reliable connection may be used to communicate with devices in the cloud (e.g., an administrative computing device 100a or application server 203) and/or other devices not in range. As such, devices in one vehicle 202 may take advantage of devices in another nearby vehicle 202 that have a better connection. Also, if one vehicle 202 is out of a communication range with another vehicle 202, information between such two vehicles 202 may be shared via an intermediate vehicle 202.

Figure 4:
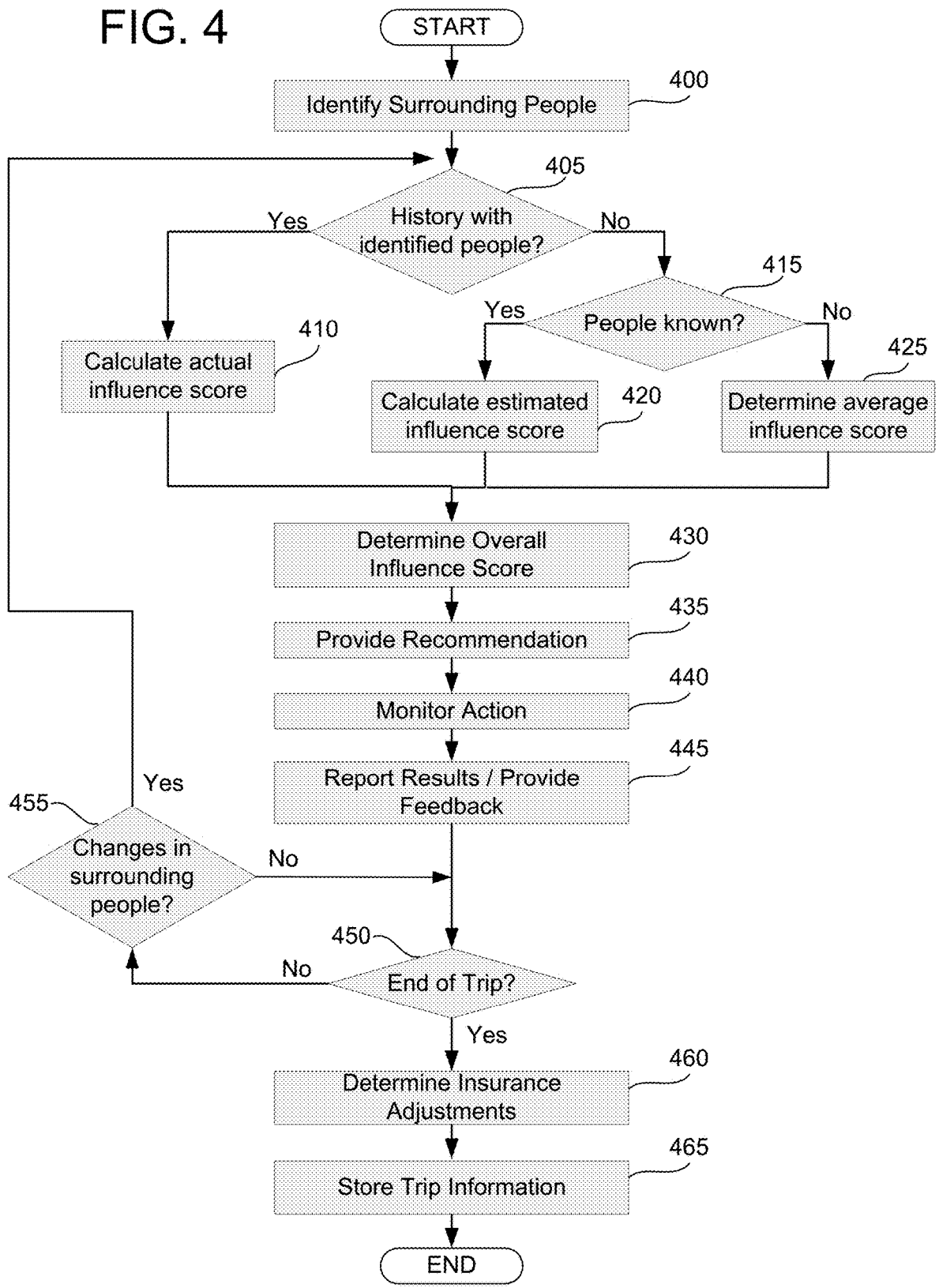
FIG. 4 illustrates a flow diagram of an example process in accordance with aspects of the present disclosure.

FIG. 4 illustrates a flow diagram for an example method in accordance with aspects of the present disclosure. In particular, FIG. 4 illustrates a plurality of steps of a method for identifying surroundings (e.g., surrounding people) and adjusting insurance rates based on a driver's reaction to the surroundings. The plurality of steps may be performed by one or more of a driver computing device 100d, passenger computing device 100p, vehicle computing device 100v, administrative computing device 100a, and/or an application server 203, which collectively form an event management system. One or more of the steps of FIG. 4 may be performed by executing an event management program and/or operating a particularly configured computing device of the event management system. As a result of the method of FIG. 4, the event management system may offer recommended actions based on surroundings and apply adjustments to a driver's insurance based on their reaction to the surroundings (e.g., based on their compliance with the recommended actions). The method of FIG. 4 may be carried out multiple times with respect to multiple drivers (simultaneously or at different times) or multiple times with respect to the same driver. For example, a driver may initiate the method of FIG. 4 each time he/she operates a vehicle (e.g., takes a trip to the store, to work, on vacation, etc.).

Prior to initiating the method of FIG. 4, one or more computing devices, such as a vehicle computing device 100v, a driver computing device 100d, and a passenger computing device 100p, may be configured to participate in the event management system and/or may be registered with the event management system. Configuring a computing device to participate in the event management system may include installing an event manager (which may include an event management program). Registering a computing device may include setting up an account (e.g., navigating to a webpage and creating a username and/or password) with a service provider (e.g., an insurance company providing the event management system).

FIG. 4 begins with step 400 in which surroundings are identified. In particular, step 400 may include identifying people surrounding a driver. Surrounding people may include passengers in a vehicle 202 being driven by the driver, a driver of another vehicle 202 in proximity to the vehicle 202 being driven by the driver, and passengers in another vehicle 202 in proximity to the vehicle 202 being driven by the driver. The surrounding people may be identified based on information entered by the driver prior to or during a trip. For example, the driver may enter names of passengers, or choose names from a previously compiled list of names of possible (or probable) passengers, into his/her driver computing device 100d or a vehicle computing device 100v of the vehicle 202 to be driven. In some embodiments, the driver may import information to identify surrounding people from an address book or other contact list on the driver computing device 100d (e.g., a smartphone) or vehicle computing device 100v.

In addition, or alternatively, the event management system may assume that certain individuals are in the vehicle 202 or in another nearby vehicle 202 based on where the vehicle is going and/or time and date information by looking at past drive history of the driver and/or vehicle 202. For example, if the vehicle 202 has been used in a caravan on Saturdays at approximately noon to go to a youth baseball game, the event management system may determine if the vehicle 202 is being used in a similar caravan for a current trip and then assume that individuals who typically participate in the caravan are likely in proximity to the vehicle 202 for the current trip. Or, if it is learned that the vehicle 202 is often used to drive a child to school, the event management system may determine that the child is in the vehicle 202 when the vehicle 202 is on its way to the school. Further, social media platforms, like Foursquare and Facebook, could be leveraged to see where people are at and to determine whether they are within proximity to the driver. For example, individuals may "check in" at vehicle 202 or a nearby place thereby indicating their position, and the event management system could use this information to determine whether those individuals are within proximity to the vehicle 202. For example, the event management system may look at social media posts to determine whether friends or family (or other linked people) of the driver are in proximity to the driver. Indeed, in some embodiments, the event management system may have a social media component to provide its own social media platform for individuals to associate themselves with certain vehicles. For example, Alice could use a social media platform provided by the event management system to indicate that she is "in" Bob's car.

Surrounding people may also be identified by "bumping" computing devices (e.g., bringing computing devices in range to communicate using near field communication (NFC)). For example, a driver may bump her smartphone against the smartphone of another driver who plans to follow her on a trip. Replies to invite messages may also be used to determine the presence of individuals surrounding the driver. For example, a driver may, using a driver computing device 100d, send out invite messages to others to join a group for a trip (e.g., to join a caravan). A user who accepts the invitation may be identified as a surrounding person for the trip.

In some cases, the event management system may receive GPS coordinates from various computing devices associated with certain people. Using the received GPS coordinates and GPS coordinates of the driver (which may be obtained from the driver's driver computing device 100d and/or a vehicle computing device 100v in a vehicle to be driven by the driver), the event management system may determine whether the devices are within proximity to the driver. If so, the individuals associated with those devices in proximity to the driver may be identified as surrounding people in step 400. Different thresholds may be used in different embodiments to determine proximity.

Still referring to step 400, surrounding people may be identified from information communicated between vehicles 202. Vehicles 202 may learn or be informed of the people therein. For example, vehicles 202 may be equipped with cameras, scanners, microphones, etc. to facilitate image and/or audio recognition to identify people or may more simply receive entries from people through a user interface of the vehicle (e.g., a touchscreen of a vehicle computing device 100v). The vehicles 202 may then exchange this information with other nearby vehicles via any of the communication protocols discussed herein. In this manner, people in a nearby vehicle may be identified as surrounding a driver in another vehicle. For example, a first driver may drive a first vehicle. The first vehicle may come into close proximity with a second vehicle having certain people therein. A vehicle computing device 100v of the second vehicle may transmit information identifying the people therein to a vehicle computing device 100v of the first vehicle. Thus, the vehicle computing device 100v of the first vehicle may determine people surrounding the first driver of the first vehicle.

In step 405, the event management system may determine whether any of the people identified in step 400 have a history with the driver. In other words, the event management system may determine whether any of the identified people have been near the driver during a past drive. The event management system may evaluate data associated with the driver's history to determine whether the data indicates that one or more of the same people were near the driver. For example, if Bob is identified as a passenger in Alice's vehicle in step 400, the event management system may evaluate data of Alice's past drives to determine whether Bob was ever in proximity to Alice before (e.g., whether Bob was ever a passenger or nearby driver when Alice was driving). If the event management system determines that it has historical data that can help it to evaluate influences on the driver's behavior of one of the identified people, the method may proceed to step 410. In some cases, a certain sample size of data may be required for the event management system to determine that the driver does have a history with one of the identified people.

In step 410, the event management system may calculate (or compute) an actual influence score for each person identified as having a history with the driver in step 405. If one identified person is determined to have a history with the driver, then an actual influence score related to that person may be calculated, whereas if two identified people are determined to have a history with the driver, then two actual influence scores may be calculated (one related to each person having a history with the driver). The actual influence score may represent an influence a particular person has on the driving behavior of the driver. For example, a particular passenger may cause the driver to drive more recklessly than the driver would have otherwise. The actual influence score may be calculated according to various algorithms using drive data for past drives of the driver. The event management system may recognize that the driver has previously driven with a particular passenger twice before. The event management system may then evaluate the drive data (e.g., vehicle telematics data collected from any one of the computing devices discussed herein and as explained in the patent applications incorporated herein) from those drives. This evaluation may include, for example, determining how fast the driver drove, whether the driver turned too hard, whether the driver stopped too abruptly, whether the driver changed lanes often, etc. This information may be evaluated with reference to preferred or acceptable standards for driving. The evaluation may also include a comparison with the typical data of the driver so that influences of the particular passenger may be derived. As such, even if a driver is generally a poor driver, the event management system may determine if a particular passenger makes that driver drive even more poorly.

For each identified person that does not have a history with the driver, the event management system may determine whether that person is known at step 415. In particular, the event management system may determine whether it has information related to one or more of the identified people at step 415. The event management system may have data that shows that the identified person generally has an influence on drivers. This data may be evaluated even though the identified person might not have a history with the instant driver. Step 415 may include checking a database for information related to the one or more people identified in step 400 to determine whether any data is available for such people. For example, the event management system may search to see if one of the identified people has been a passenger in another driver's vehicle.

For each identified person that does not have a history with the driver but is known to the event management system, an estimated influence score may be determined at step 420. The estimated influence score may represent an influence that the event management system estimates certain people may have on the driver. This estimated influence score is determined based on data related to an identified person (e.g., a passenger or nearby driver) that the event management system has previously collected. As such, the estimated influence score may be characterized as an educated estimation of the influence that a particular person may have on a driver's behavior. Various algorithms may be used to combine the data known about a person to arrive at the estimated influence score for that person.

For example, the event management system may recognize that Carol is a passenger in a car driven by Dan, but might not have past data where Dan was a driver and Carol was his passenger. However, the event management system may have data for other drivers where Carol was a passenger. The event management system may be configured to use that data to determine an estimated influence score associated with Carol for the drive Dan is making or planning to make. Therefore, if Carol has been a negative influence on other drivers in the past, the event management system may estimate that she will be a negative influence on Dan.

If the event management system determines that people are not known at step 415, step 425 may be performed. Step 425 may be performed for each person that is identified as surrounding the driver, does not have a history with the driver, and is not known to the event management system (or there is not enough data for the event management system to determine an estimated influence score). For each of these people, the event management system may determine an average influence score at step 425. The average influence score may be determined based on statistical information gathered by the event management system or a third party. If statistical information indicates that males between the ages of 18 and 25 tend to have a strong influence on other males of similar age, this information may be used to calculate an average influence score. The event management system may consider various statistical and demographical information when determining the average influence score. Moreover, the event management system may consider demographical information of both the driver as well as the surrounding people.

The scores determined in steps 410, 420, and 430 may be scaled so as to fall within a range so that lower scores may indicate a weak or negative influence, while higher scores may indicate a strong or positive influence. Alternatively, only negative influence may be considered and higher scores may be indicative of a stronger negative influence. Still, in some cases the scores may be positive and negative, where negative scores indicate negative influences and positive scores indicate positive influences. In such cases, the more negative scores may indicate stronger negative influences. For example, a score of −5 may represent a weak negative influence in comparison to a score of −10, which may indicate that the driver tends to drive very poorly when the associated person is nearby.

At step 430, an overall influence score may be determined. The overall influence score may be determined by processing the scores determined in steps 410, 420, and 430. In some examples, the actual influence score(s), estimated influence score(s), and/or average influence score(s) may be aggregated. Various algorithms may be used to aggregate the scores. Different weights may be given to the different scores. That is, actual influence scores may be given a first weight, estimated influence scores may be given a second weight, and average influence scores may be given a third weight. Still, one or more of these weights may be the same. In some embodiments, the actual influence scores may be considered more important or more reliable, and thus, the actual influence scores may be given more weight than the other scores. By aggregating the scores in step 430, the event management system may account for all people identified as surrounding the driver.

Alternatively, in some embodiments, the overall influence score may correspond to the most polarizing score. That is, the overall influence score may be determined by selecting the most negative or most positive score. The event management system may consider that the influence a certain person may have on the driver might not be tempered or exacerbated by others nearby the driver. For example, in a situation where one passenger has an influence score that indicates he/she may have a strong negative influence on the driver, the overall influence score may be assigned that passenger's score because it may presume that that passenger will likely have a negative influence on the driver regardless of who the other passengers in the vehicle 202 may be.

In step 435, the event management system may determine whether or not to provide a recommendation. This determination may be based on the overall influence score. In some embodiments, this determination may include comparing the overall influence score with a predetermined threshold. Alternatively, where an overall influence score is not computed in step 430, the event management system may determine whether a recommended action should be provided on the basis of each person in the surroundings. More specifically, the event management system may consider the scores of each person surrounding the driver and determine whether the corresponding score exceeds a threshold thereby warranting a recommendation with respect to the corresponding surrounding person. Such predetermined thresholds may vary on a user-by-user (e.g., driver-by-driver) basis. As such, recommendations may be more frequently given to some drivers than others. In some embodiments, users (e.g., drivers) may configure the event management system to modify this threshold. In this manner, users may control how many or how often the event management provides recommendations. For example, users who may only want recommendations in rare circumstances may set the predetermined threshold to be high. In such an example, only where a strongly influential person is nearby will the event management system provide a recommendation.

Whether or not a recommendation is to be provided may also depend on the type of recommendation and/or timing of the recommendation. If the system determines that the type of recommendation is unlikely to be effective, the system may determine not to provide the recommendation. The likelihood of whether a particular type of recommendation will be effective may be established based on analysis of past drives of the driver to receive the recommendation and/or past drives of other drivers. For example, if the system determines that a particular driver does not stay away from other nearby dangerous drivers even when warned, the system may determine to stop providing that particular driver with related recommendations. In comparison, if a particular driver does stay away from other nearby dangerous drivers when warned, then the system may continue to provide that particular driver with recommendations warning the driver of dangerous nearby drivers when appropriate. As such, the event management system may determine which recommendations tend to work and use this determination to decide which recommendations to provide. It is contemplated that certain recommendations may have an impact on some groups of people, but not others. Therefore, the event management system may consider characteristics of the driver when determining whether to provide that driver with a recommendation, so the recommendation might only be provided if the driver belongs to certain group(s). For example, if it is determined that male drivers between 50 and 75 years old refuse to take different routes, the system might not recommend a route modification to an older, male driver falling within such a group. In comparison, if it is determined, for example, that young female drivers are receptive of warnings to slow down, then a younger female might be provided with a recommendation to slow down when she is driving too fast.

If the event management determines that a recommendation should be given, the event management system may also determine what the recommended action should be in step 435. The recommended actions may include suggestions on how to operate the vehicle (e.g., whether to accelerate/decelerate, which lane to drive in, to slow down for turns, use turn signals, turn on lights, etc.) or may notify the driver about certain people surrounding them (e.g., may alert the driver that certain people may negatively impact their driving performance). For example, if the driver is being followed by another vehicle (e.g., in a caravan), the system may recommend that the driver use turn signals so that the driver of the following may be alerted to the upcoming turn or lane change. Also, for example, if the system detects that a first driver of a vehicle ahead commonly and/or abruptly switches lanes (e.g., is a reckless driver) or has been involved in one or more accidents by cutting off others, the system may recommend that a second driver pass the first driver with caution. In this scenario, the system may also recommend that the second driver turn on his/her vehicle lights while driving alongside the first driver so as to be more visible to the first driver.

Further, determining the contents of the recommendation may include selecting one or more recommended actions stored in memory. For example, the event management system may include a database for storing commands providing recommended actions, such as: "Be more vigilant;" "Slow down;" "Speed up;" "Drive behind the white Ford car;" "Pass the vehicle in front of you;" "Do not tailgate Bob because he tends to slam on his breaks;" "Operate vehicle with caution;" "Avoid nearby driver;" "Pull over;" "Don't pay attention to person X." The recommendations may be selected without regard to the driver's surroundings or the people surrounding the driver. The event management system may presume that if a recommendation is to be given, the recommendation should be a set default recommendation, such as "Drive carefully" or Be more vigilant."

In some embodiments, the recommendations may be tailored based on the driver's surroundings or people surrounding the driver. For example, where Alice is identified as a negative influence on the driver, the recommendation may include: "Alice is a negative influence so do not take her driving advice;" or "Alice has previously been detrimental to your driving performance." To generate such tailored recommendations, the event management system may use templates of recommendations stored in a database, and populate the templates with information gathered about the driver's surroundings (e.g., names of passengers). In some embodiments, multiple recommendations may be given with respect to one or more people surrounding the driver. For example, where Alice and Bob are both passengers, the event management system may alert the driver that Alice is a positive influence on the driver, and that Bob is a negative influence on the driver.

Further, the event management system may factor in the driver's surroundings when selecting the recommended actions. The event management system may determine that certain recommendations are appropriate depending on the situation. For example, the event management system may consider whether a nearby driver is a reckless driver. If so, the event management system may generate a recommendation to avoid the nearby driver by slowing down. The event management system may also indicate which vehicle to avoid. For example, the event management system may provide a message recommending that the driver avoid a red pick-up truck with New York license plates. Different description and the details of the descriptions may vary. In another example, where a motorcycle is fast approaching from behind, the event management system may instruct the driver to move to a right lane. To generate such a recommendation, the event management system may consult map data to determine the number of lanes on a road and/or may use sensors (e.g., cameras, sonar, radar, etc.) to determine where the driver's vehicle is positioned and where other vehicles are positioned. Further, in some embodiments, the recommendation may be in the form of proposed directions. For example, if the system detects that a driver is approaching one or more dangerous vehicles, the system may recommend that the driver take a different route by providing proposed directions. If the driver is using a navigation system (e.g., GPS system), the recommendation may be in the form of modifying the route in the navigation system to take an alternative route.

When a recommended action is generated, the recommended action may be outputted to the driver. The event management system may output the recommended action in various ways using various computing devices. For example, the recommended action may be a symbol or text displayed on a dashboard or projected onto a windshield of a vehicle by a vehicle computing device 100v, driver computing device 100d, or passenger computing device 100p. The recommendation could also be outputted as an audio message through speakers of the vehicle and/or speakers of a computing device by any one of a vehicle computing device 100v, driver computing device 100d, or passenger computing device 100p.

In some embodiments, the recommended action provided in step 435 may be accompanied by an offer to adjust the driver's insurance. In such cases, the event management system may determine adjustments as described further below in advance for providing them with the recommended action. By providing proposed adjustments along with the recommendations, the event management system may incentivize the driver to follow the recommendation.

In step 440, the event management system may monitor driver actions to determine the driver's reaction to the recommendation. A driver's reaction may be determined based on drive data, such as vehicle telematics data and other sensor data. Drive data may include various types of information indicative of various events that may take place during a drive. One or more of the computing devices (e.g., vehicle computing device 100v, driver computing device 100d, or passenger computing device 100p) may be used to collect the drive data. For example, an accelerometer, a gyroscope, or a GPS receiver of a driver computing device 100d (e.g., a driver's smartphone) within a vehicle 202 being operated by a driver may be used to measure acceleration of the vehicle 202. From the acceleration data, the event management system may determine whether the vehicle 202 was operated according to a recommended action. Specifically, the event management system may evaluate the acceleration data for a time period immediately after it provides a recommendation.

Additionally, or alternatively, drive data from sensors (e.g., optical sensors, position sensors, proximity sensors, encoders, pressure sensors, etc.) of the vehicle 202 may be used to determine a driver's reaction to a recommendation. For example, sensors on the vehicle's steering column and/or wheel may be used to determine how the vehicle 202 is steered, while sensors on a brake pedal and/or gas pedal may be used to determine whether the vehicle speed was adjusted. If the system recommends that a driver and passenger switch seats so that the passenger may take over driving responsibilities, sensors in the seats may determine whether the switch took place. Drive data of other vehicles may also be used to determine a driver's reaction. For example, if the recommendation is to maintain a certain distance from a particular vehicle or whatever vehicle is directly in front of the driver's vehicle, then the event management system may consider the GPS coordinates of both the driver's vehicle and the particular vehicle or the vehicle in front to determine whether the driver is following the recommended action.

Step 440 may include the evaluation of the collected drive data. The evaluation may be done by the same computing device that collects the drive data or a different computing device. For example, if the vehicle computing device 100v collects acceleration data, that vehicle computing device 100v may also evaluate the acceleration data to determine whether the recommended action was followed. Or, the vehicle computing device 100v may transmit the drive data to an application server 203 dedicated for performing the processing needed to evaluate the drive data. In some cases, the vehicle computing device 100v may transmit the drive data to the application server 203 through another computing device (e.g., a driver computing device 100d) with connectivity to the network 201 through, e.g., a cellular backhaul. By off-loading the evaluation process in this manner, the vehicle computing device 100v may dedicate resources to collecting additional drive data and/or performing other processes (e.g., providing additional recommendations).

Based on the results of the evaluation at step 440, results and/or feedback may be provided to the driver at step 445. The event management system may inform the driver regarding whether or not he/she appropriately reacted to the recommendation provided. For example, the event management system may provide the driver with an acknowledgement that the driver properly followed the recommended course of action. In contrast, the event management system may alert the driver when he/she improperly followed the recommended course of action or ignored the recommended course of action. The feedback may be as simple as indicating whether or not the driver properly performed the recommended course of action, or may be more granular and include an indication of how closely the driver performed the recommended action, tips on how the driver could improve for next time, and/or further recommendations based on the evaluation (e.g., a recommendation to increase the distance from the vehicle ahead a bit more). The results and/or feedback may be provided in any of the ways in which the recommendation is provided. However, the results and/or feedback do not have to be provided in the same way in which the recommended action is provided. For example, the recommendation may be delivered in the form of an audio message, while the results may be reported by briefly turning on a green light indicating that the recommended action is complete.

In step 450, the event management system may determine whether or not the trip has ended. That is, the event management system may determine whether the driver has ended their driving session. The event management system may conclude that the trip has ended when, e.g., the vehicle 202 reaches the destination of a planned route (e.g., a route entered in a GPS system), the vehicle 202 is turned off, and/or the vehicle 202 is stopped for a predetermined amount of time. Alternatively, the event management system may determine that the trip is over based on a user input indicating that the trip is over. For example, the user may press a button on his/her driver computing device 100d (e.g., smartphone) or the vehicle computing device 100v to notify the event management system that the trip is complete. Notably, the user may notify the event management system that the trip is ended prior to completing a driving session, and thus, the event management system may consider the trip to be ended prior to it actually ending. In particular, the trip may be considered to be ended when a driver changes.

If an end of the trip is not detected (No at 450), the event management system may determine whether there are changes in the surrounding people at step 455. Step 455 may include processes performed in step 400, such as the identifying of surrounding people. In addition, step 455 may include comparing the newly identified surrounding people with the surrounding people previously identified to determine whether there have been changes. For example, the driver may stop to pick up another passenger at some point during the trip, and therefore, the surrounding people may change. If the newly picked-up passenger is known or expected to negatively (or positively) influence the driver, the event management system may want to account for this new passenger. Changes may also occur when another vehicle comes within a certain distance of the driver's vehicle 202. Accordingly, as shown in FIG. 4, if changes in the surrounding people are detected, the process may return to step 405. Unless changes are detected, the event management system may continue to detect whether the trip has ended at step 450.

If the trip has ended, the event management system may determine insurance adjustments at step 460. Insurance companies may offer drivers automobile insurance for a base price. Drivers may agree to pay this base price by making insurance premium payments monthly, semi-annually, annually, etc. In accordance with the event based insurance model described herein, these payments may be adjusted. Specifically, the event management system may determine whether to adjust these payments based on a driver's reaction to recommended actions. If a driver follows a recommended action, the event management system may determine that the driver should receive a discount or credit on their next payment. Accordingly, the event management system may reward drivers for demonstrating safe driving behavior. In contrast, if a driver ignores or otherwise fails to follow a recommended action, the event management system may penalize the driver by charging an additional fee or reducing a previously acquired discount or credit. As such, the event management system may also incentivize a driver to follow recommended actions, and thus, practice safe driving behavior.

In some embodiments, only certain reactions may be rewarded. For example, although the event management system may provide numerous recommendations and monitor reactions thereto, the event management system might only apply a discount/credit if a driver reacts to recommendations regarding a particular nearby vehicle 202 (e.g., a vehicle 202 being followed or a vehicle 202 that is following the driver). Also, in some embodiments, the event management system may require that the driver follow a certain number of recommended actions before applying an adjustment. For example, a driver may need to follow five recommended actions to receive a discount/credit, or may need to follow three consecutive recommended actions to receive a discount/credit. In some cases, these requirements must be fulfilled in a single drive, whereas in other cases, the requirements can be fulfilled over the course of multiple drives. The event management system may be configured to track the recommended actions and reactions thereto for each driver. As such, the event management system may recognize that a driver followed three recommended actions in one drive and two more in another thereby reaching a milestone of five followed recommendations, and may determine to adjust the driver's insurance payments upon reaching this milestone.

In addition to determining whether to adjust an insurance payment, the event management system may determine an amount of the adjustment. The adjustment may be the same amount for each driver or may be a percentage of the driver's payment. Alternatively, the degree of adjustments may depend on an insurance plan of the driver. For example, premium tier clients may receive greater adjustments than clients at a lower tier. Also, the adjustments may be a set amount for each recommendation or may vary depending on the recommendation. For example, following a recommendation to avoid a reckless driver may yield a greater reward than following a recommendation to increase distance from a vehicle in front of the driver's vehicle. Further, the adjustments may vary according to the reaction. For example, if the recommended course of action is to slow down, the event management system may award a greater discount/credit the more the driver slows down. Or, if the recommendation relates to avoiding a particular nearby driver, the event management system may award a greater discount/credit the more dangerous the particular nearby driver is deemed to be. Accordingly, the amount of the adjustment may be performance based.

Step 460 may also include storing the adjustments. The event management system may store the adjustments in association with each driver or driver's policy for the purpose of keeping track of the adjustments until the adjustments are redeemed. Alternatively, the event management system may communicate the adjustments to a billing system that manages billing functions (e.g., calculates and generates bills). For example, the event management system may transmit a driver identifier and an adjustment amount to a billing system connected to network 201 so that the billing system may apply the adjustment to the appropriate policy. The event management system may also provide the billing system with a description or billing code so that the bill sent to the driver may include a description of the reason for the adjustment. In this manner, drivers may learn about what driving behavior is saving them money so that they might focus on repeating such behavior in future drives.

Although the adjustments have been described as adjustments to a periodic (e.g., monthly, semi-annual, annual, etc.) bill, it is contemplated that the adjustments may be distributed separately. For example, the adjustments may be disseminated in the form of a check sent to the driver (e.g., similar to a cash-back reward) or credit to an account. In particular, such forms of providing the adjustments may be used where a driver has already paid the full price of their insurance plan. In some embodiments, the adjustments might only be applied after a certain amount has been accrued. For example, the event management system might only send a check to the driver (or instruct the billing system to send a check to the driver) after the driver has accrued $50 in adjustments. Such a threshold may depend on the driver and/or policy (e.g., premium tier customers may get checks more frequently).

In step 465, the event management system may store trip information. Specifically, the event management system may store drive data in association with the people identified in the driver's surroundings. As such, the event management system may compile a record of how the driver's behavior is affected by certain individuals. This information can then be used in future recommendations for the driver. For example, the event management system may store information indicating that the driver drove faster than usual with a particular passenger in the car, or when the driver was following or being followed by a particular driver.

Figure 5:
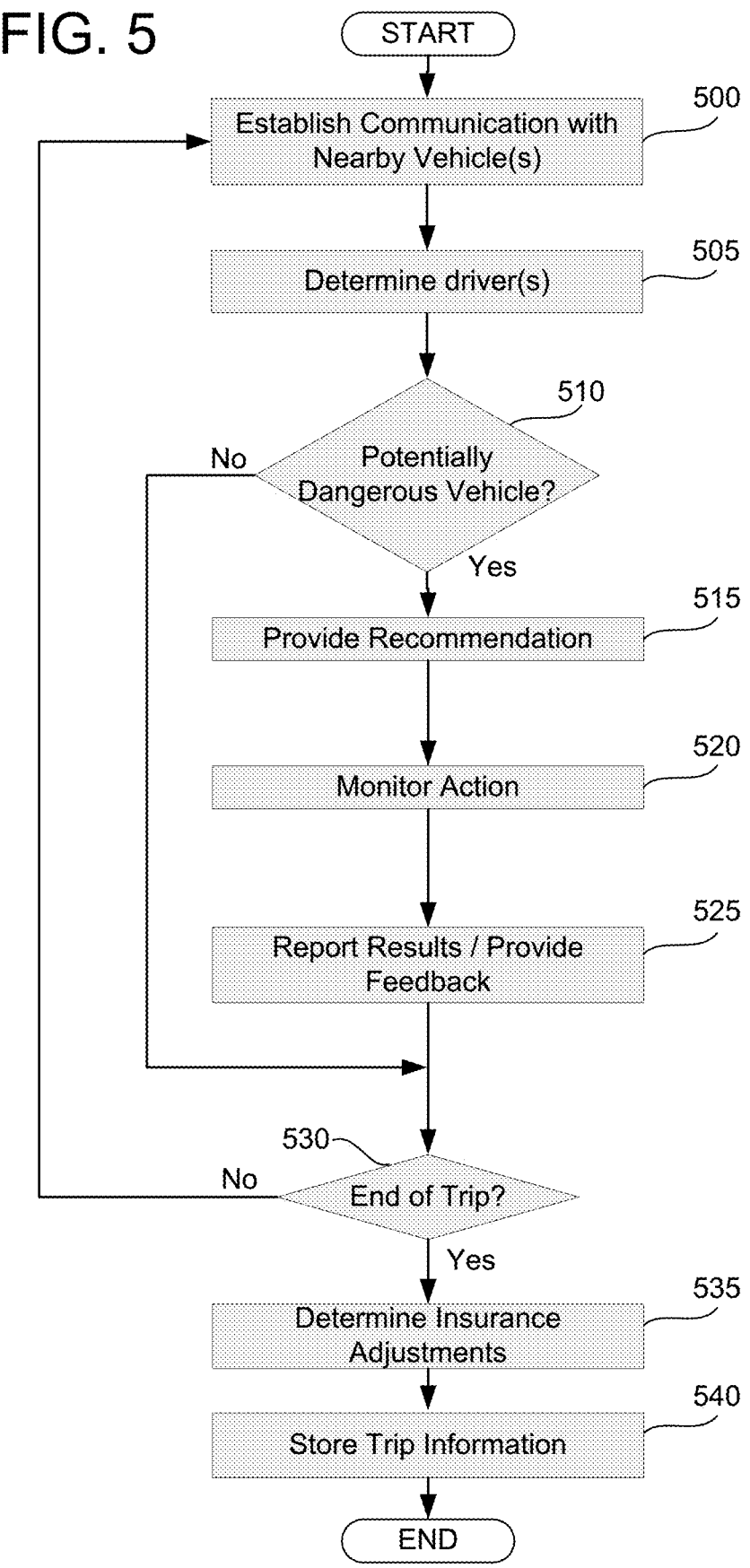
FIG. 5 illustrates a flow diagram of an example process in accordance with aspects of the present disclosure.

FIG. 5 illustrates a flow diagram for an example method in accordance with further aspects of the present disclosure. In particular, FIG. 5 illustrates a plurality of steps of a method for warning a driver about a nearby vehicle 202 and adjusting insurance rates based on a driver's reaction to such warnings. The plurality of steps in FIG. 5 may be performed by one or more of a driver computing device 100d, passenger computing device 100p, vehicle computing device 100v, administrative computing device 100a, and/or an application server 203, which collectively form an event management system. One or more of the steps of FIG. 5 may be performed by executing an event management program and/or operating a particularly configured computing device of the event management system. As a result of the method of FIG. 5, the event management system may offer recommended actions based on surroundings (e.g., nearby drivers) and apply adjustments to a driver's insurance based on their reaction to the surroundings (e.g., based on their compliance with the recommended actions). The method of FIG. 5 may be carried out multiple times with respect to multiple drivers (simultaneously or at different times) or multiple times with respect to the same driver. For example, a driver may initiate the method of FIG. 5 each time he/she operates a vehicle (e.g., takes a trip to the store, to work, on vacation, etc.).

Steps in FIG. 5 are described with respect to a particular vehicle 202 driven by a particular driver. In step 500, the event management system may establish communication between the particular vehicle 202 and one or more vehicles 202 in proximity (e.g., within 5 m, 10 m, 15 m, 20 m, 50 m, etc.) of the particular vehicle 202. For example, a vehicle computing device 100v of the driver's vehicle 202 may establish a connection with another vehicle computing device 100v of a nearby vehicle 202. Or, a driver computing device 100d in the particular driver's vehicle 202 may establish a connection with another driver computing device 100d or passenger computing device 100p in another nearby vehicle 202. Any of the communication protocols and methods described above may be used to establish the communication of step 500.

Once a communication channel between a particular vehicle and another nearby vehicle 202 is set up, the event management system may determine who is driving the nearby vehicle 202 at step 505. A computing device (e.g., driver computing device 100d) associated with the nearby vehicle may transmit an identifier (e.g., an alphanumeric code or name) of a driver of the nearby vehicle 202 to a computing device of the particular vehicle 202. The computing device 100 in the particular vehicle 202 may determine the driver of the nearby vehicle 202 itself or may consult the application server 203. The application server 203 may include a database that associates names and/or codes with drivers so that it can be used to identify drivers and associated information regarding the drivers using the names and/or codes. In some cases, a computing device 100 in a nearby vehicle 202 may provide a license plate number of the nearby vehicle, and the event management system may consult a database associating license plate numbers with drivers to identify the driver of the nearby vehicle 202. Similarly, a driver computing device 100d (e.g., a smartphone) in the nearby vehicle 202 may provide its telephone number, which the event management system may use to identify the driver. The event management system may include a directory associating telephone numbers and/or license plate numbers with drivers or may access such a directory for the purpose of identifying any nearby drivers.

In some embodiments, communication between vehicles 202 may be by way of a server (e.g., an application server 203) that computing devices (e.g., driver computing devices 100d, passenger computing device 100p, vehicle computing device 100v) may communicate with. For example, a first driver computing device 100d in a first vehicle 202 may communicate with an application server 203, which in turn may communicate with a second driver computing device 100d in a second vehicle 202 that happens to be nearby the first vehicle 202. In some embodiments, the computing devices 100 in the vehicles 202 may execute a program (e.g., an event management program) provided and supported by the event management system. Using the program, people may communicate with a central application server 203. In particular, the programs running on the different computing devices 100 in various vehicles 202 may transmit location information (e.g., GPS coordinates) to the application server 203, which may then maintain a database of the positions of the various vehicles 202. Using this collected information, the application server 203 or any of the other computing devices 100 may determine the drivers of the nearby vehicles 202. For example, if a first driver in a first vehicle executes a program on a computing device 100 within the first vehicle, while a second driver in a second vehicle executes a similar program on a computing device 100 within the second vehicle, the application server 203 may receive location information of both vehicles 202, determine they are nearby each other, and notify the computing devices of the other nearby vehicle 202. Accordingly, once the nearby vehicles 202 are identified, their associated drivers can also be identified. The application server may store the associated drivers in the same database with the location information or another database.

Further, in some embodiments, the computing devices or a camera attached to the vehicle may be used to capture an image of the vehicle's surroundings. The image could then be processed by the computing devices 100 within the vehicle 202 or sent upstream to the application server for processing. Image analysis may be performed on the image to determine characteristics (e.g., make, model, color, year, etc.) of the surrounding vehicles 202. Image analysis could also be done to determine the license plate of the nearby vehicles 202. Once the nearby vehicle(s) is identified, the drivers of such nearby vehicle(s) may be identified using a database as described herein that correlates drivers with their vehicles. An example of such a database may be a database used by insurance companies that provide auto insurance to customers.

In step 510, the event management system may determine whether any of the identified nearby drivers are considered dangerous, reckless, etc. The event management system may include a database with drive data (e.g., vehicle telematics data) in association with drivers. Using such a database, the event management system may evaluate the drive data of a nearby driver to determine whether that driver is dangerous, reckless, or otherwise should be avoided. Alternatively, the event management system might not perform the evaluation itself, and instead, may consult a database storing ratings of drivers. Such ratings may be determined in advance based on collected drive data or insurance rates (e.g., high insurance rates may indicate that the driver is reckless or otherwise a liability) so that the event management system may efficiently look up ratings and determine whether nearby drivers should be avoided or kept at a distance. For example, a database with driver names/identifiers and corresponding scores on a scale of, e.g., 1 to 5 (where 1 represents that the worst driving behavior and 5 represents the best driving behavior) may be consulted by the event management system. If any drivers determined at step 505 have a score of, e.g., two or less, those drivers may be considered dangerous.

In some embodiments, the event management system may use law enforcement databases to determine whether drivers are dangerous. For example, the event management system may determine a number of and/or what type of tickets a nearby driver has received based on police records and/or results of a speed camera. If a nearby driver has, for example, received multiple speeding tickets and/or a reckless driving ticket, the event management system may determine that the nearby driver is a dangerous driver. Additionally, or alternatively, the event management system may group drivers into categories deemed to be represent the likelihood that a driver is dangerous. For example, the event management system may determine that the identified nearby driver is a young male, and therefore, conclude that the nearby driver is a dangerous driver on the basis that young male drivers are considered to be more dangerous. Similarly, whether a nearby driver is dangerous may be judged based on the type of vehicle. For example, the event management system may determine that a nearby driver is dangerous if the nearby vehicle is a red sports car, but not if it is a sedan or minivan. Accordingly, if a sports car approaches a vehicle 202, the event management system may determine that a dangerous sports car is nearby and may provide a recommendation to the driver of the vehicle 202 indicating that the driver should move over and let the sports car pass.

If none of the nearby drivers are identified as dangerous, the method may jump to step 530. If one of the drivers is identified as dangerous, the event management system may determine whether to provide a recommendation to the particular driver at step 515. If the event management system determines to provide a recommendation, an appropriate recommendation may be generated and delivered to the particular driver. For example, at step 515, the event management system may determine to warn the particular driver to stay away from a nearby vehicle 202 driven by a driver who might be dangerous and may deliver a message to the particular driver accordingly. The recommendation provided at step 515 may include various information having details of various degrees. In some cases, the recommendation may provide a description of the vehicle 202 to be avoided, while in other cases, the recommendation may include an action for the particular driver to perform (such as a suggestion to reduce speed or change lanes to increase a distance between the particular driver's vehicle 202 and the nearby vehicle 202 being driven by the driver deemed to be dangerous). Details regarding the determination, generation, and delivery of the recommendation at step 515 may be similar to those discussed above with respect to step 435 of FIG. 4.

Step 520 may include monitoring actions of the particular driver. Based on the actions of the particular driver, the event management system may determine how the particular driver reacted to the recommendation. Specifically, the event management system may monitor the particular driver's action to determine whether the recommendation was followed or whether the recommendation was ignored or otherwise not followed (e.g., incorrectly followed). For example, if the recommendation provided in step 515 is to maintain a distance of 50 meters from a nearby vehicle 202, the event management system may recognize if the particular driver decreases the speed of his/her vehicle 202 to maintain the recommended distance at step 520. Further details regarding the monitoring performed at step 520 may be found in the description above with regards to step 440.

The results of the monitoring may be reported to the particular driver at step 525. For example, in the case where the recommendation is to maintain a distance of 50 meters from a nearby vehicle 202, the event management system may provide a report to the particular driver indicating whether the driver has successfully maintained the recommended distance or not. In addition, or alternatively, the event management system may inform the particular driver that he/she needs to further decrease the speed of his/her vehicle 202 to maintain the recommended distance. By providing feedback to the particular driver, the event management system may assist the user in achieving the recommended course of action.

At step 530, the event management system may detect whether the trip has ended. Step 530 may be similar to step 450 described above. If the trip has not ended, the method may return to step 500 to establish further connections with other nearby vehicles if other nearby vehicles come within a certain range of the particular driver. As such, steps of FIG. 5 may be repeated to provide multiple recommendations throughout a trip, and thus, the event management system may assist the particular driver in avoiding multiple dangerous drivers that may come within the vicinity of the particular driver during the trip.

After the trip ends (Yes at 530), the event management system may determine insurance adjustments at step 535 and may store trip information at step 540. Steps 535 and 540 may include similar features discussed above with respect to steps 460 and 465, respectively, and thus, further description is omitted here.

As a result of performing the method of FIG. 5, a particular driver may be rewarded for taking appropriate action to avoid a nearby dangerous driver. The event management system may identify such dangerous drivers, provide recommendations so that the particular driver can take an appropriate action, and allocate rewards so that the driver is incentivized to participate in the event based insurance model and practice safe driving behavior. In return for adjustments to insurance payments, insurance companies implementing an event based insurance model with the event management system may reduce liability or risk thereof, and promote safe driving behavior.

Additional embodiments may also be realized using the event management system described herein. For example, rather than performing steps 500, 505, and 510, the event management system may use data from sensors (e.g., sonar, radar, cameras, etc.) of a particular vehicle 202, GPS coordinate information, and/or drive data (which may be received by the particular vehicle 202 from other nearby vehicles 202) to detect behavior of nearby vehicles 202 so as to determine whether any nearby vehicles should be avoided. Accordingly, rather than identifying nearby drivers and assuming that certain drivers may be dangerous based on their past driving record, the event management system may evaluate how nearby vehicles are currently performing to determine whether they are dangerous. For example, the vehicle computing device 100v of a particular driver's vehicle may detect that a nearby vehicle is swerving in front of it or fast approaching from the rear, and may recommend that the particular driver slow down and move to the rightmost lane.

Aspects of this disclosure may be implemented in numerous environments. For example, the event management system may be employed to provide an event based insurance model to a driver participating in a caravan. A caravan may be any group of two or more vehicles travelling together for at least part of a trip. In some cases, the caravan may include dangerous drivers or drivers known to have a negative influence over others. In such cases, the event management system may identify such dangerous drivers within the caravan and provide recommendations to one or more of the other drivers in the caravan. For example, the event management system may identify that one of the drivers in the caravan is driving reckless and may provide a recommendation to a particular driver to maintain a certain distance from the reckless driver. The event management system may then monitor the actions of the particular driver to determine if he/she maintains this distance, and if so may adjust the particular driver's insurance to reward him/her for following the recommended action. In addition, or alternatively, the event management system may determine which drivers are more compatible with a particular driver and may recommend that the particular driver situate their vehicle near those drivers and reward the particular driver if he/she does so.

Further, the event based insurance model may also be used in conjunction with a usage based insurance model. In other words, a group's insurance rate may be adjusted based on the group's reaction and/or a leader's reaction to surroundings (e.g., nearby dangerous drivers). For example, the event management system may identify a dangerous driver that comes within a certain distance of one of the vehicles in a caravan, and may provide a recommended action to one or more of the vehicles in the caravan (e.g., all vehicles or just the leader of the caravan) to help the caravan avoid the dangerous driver. The event management system may then monitor the actions of the vehicles in the caravan and determine which of those vehicles reacted appropriately so that adjustments in insurance payments may be awarded to proper drivers within the caravan.

Additionally, aspects of the disclosure may be implemented to recommend who a particular driver should and should not allow to be a passenger. Such aspects may be particularly suited for advising users on who or who not to car pool with. In a car pool, people may take turns driving to work, school, etc., or one person may assume all driving responsibilities. Aspects of the disclosure may support a ride sharing (or car-pooling) program for assisting users to determine who to car pool with. The program may also suggest who should be the driver and who should be a passenger. Based on the drive data, the event management system may determine which passengers may have a negative influence on a driver. The event management system may recommend that the driver stop participating in a car pool with certain people who have been identified as having a negative impact on the driver's driving performance, and/or may recommend that the driver continue to participate in a car pool with certain people who have been identified as having a positive impact on the driver's driving performance. The event management system may then keep track of the passengers of the driver over time to determine who the driver has been car-pooling with. If the event management system determines that the driver has followed its recommendation to stop car-pooling with certain individuals who have been a negative influence, the event management system may adjust the driver's insurance. In some embodiments, rather than suggesting that the driver stop car-pooling with a certain person, the event management system may suggest that the driver car pool at a different time (e.g., earlier in the morning) when conditions (e.g., traffic) might be safer. The event management system may then reward drivers who follow such suggested actions.

Aspects of the disclosure may also be implemented to provide insurance adjustments based on reactions of drivers in various surroundings. Although FIGS. 4 and 5 largely focus on the reactions of a particular driver when certain people (e.g., passengers and other drivers) are near the particular driver, the event management system may perform similar steps to provide insurance adjustments based on reactions of the driver to other aspects of his/her surroundings (e.g., situations/events occurring around the driver, weather conditions, traffic conditions, etc.). For example, one or more of the computing devices (e.g., vehicle computing device 100v, driver computing device 100d, or passenger computing device 100p) may detect a problem with the vehicle, such as a flat tire. The event management system may provide a recommended action based on the detected problem and monitor whether the driver follows the recommended action. The event management system may then apply adjustments to insurance based on results of the monitoring. In another example, one or more of the computing devices (e.g., application server 203) may detect that a vehicle is being driven in bad weather conditions and may provide recommended actions (such as to pull over and wait out a storm) to deal with the weather. The event management system may monitor user reactions to such recommendations and adjust insurance payments accordingly. Still, in another example, the event management system may detect poor road conditions or traffic, and may recommend an alternate route to a driver. The event management system may then adjust insurance based on whether the driver takes the recommended alternate route. The above examples are just a few examples of situations in which the event management system may offer recommendations and gauge driver reactions to carry out an event based insurance model.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the figures and described herein may be performed in other than the recited order, that additional steps may be added, and that one or more steps illustrated may be optional in accordance with aspects of the invention.

What is claimed is:
1. A system, comprising:
a computer-readable storage media;
a plurality of vehicle sensors of a first vehicle;
a first computing device in the first vehicle, wherein the first computing device comprises a plurality of device sensors; and
a second computing device that is remote from the first computing device and configured to:
while a first driver is driving the first vehicle, identify a person in proximity to the first driver, wherein the person in proximity to the first driver comprises a passenger of the first vehicle, a second driver of a second vehicle in proximity to the first vehicle, or a passenger of the second vehicle;
retrieve, from the computer-readable storage media, data indicating a driving influence of the identified person;
determine, based on the data indicating the driving influence of the identified person, an influence score related to the identified person;

determine, based on the influence score related to the identified person, a first recommendation for the first driver to perform a first action;

provide, to the first computing device and via a wireless communication system, the first recommendation for output to the first driver;

selecting, based on the first recommendation and from among the plurality of vehicle sensors and the plurality of device sensors, at least one first sensor from which to obtain first drive data to evaluate for a reaction of the first driver to the first recommendation;

determine, based on the first drive data obtained from the selected at least one first sensor, a first reaction of the first driver to the first recommendation;

determine, based on a comparison of the first reaction with the first action, that the first driver followed the first recommendation; and in response to determining that the first driver followed the first recommendation:

determine a first adjustment to an insurance payment associated with an insurance policy for the first driver; and store, in the computer-readable storage media, the first adjustment in association with the insurance policy for the first driver.

2. The system of claim 1, wherein the second computing device is further configured to:

while the first driver is driving the first vehicle, identify a characteristic of an environment surrounding the first vehicle;

determine, based on the identified characteristic, a second recommendation for the first driver to perform a second action;

provide, to the first computing device and via the wireless communication system, the second recommendation for output to the first driver;

determine, based on second drive data obtained from at least one second sensor selected from among the plurality of vehicle sensors and the plurality of device sensors, a second reaction of the first driver to the second recommendation;

determine, based on a comparison of the second reaction with the second action, that the first driver followed the second recommendation; and in response to determining that the first driver followed the second recommendation, determine a second adjustment to the insurance payment.

3. The system of claim 1, wherein the influence score represents an expected influence of the identified person on a driving performance of the first driver.

4. The system of claim 1, wherein the second computing device is further configured to generate the first recommendation based on determining that the influence score exceeds a predetermined threshold.

5. The system of claim 1, wherein the first recommendation comprises:

a suggestion to avoid the second vehicle, wherein the identified person is the second driver of the second vehicle, or a warning that the identified person has a negative influence on driving behavior.

6. The system of claim 1, wherein the data indicating the driving influence of the identified person comprises past drive data comprising data of at least one drive in which the first driver was driving and the identified person was in proximity to the first driver during the at least one drive, and wherein determining the influence score comprises:

determining, based on the past drive data, whether the first driver has a history with the identified person; and based on determining that the first driver has the history with the identified person, calculating the influence score representing an influence that the identified person has had on a driving performance of the first driver.

7. The system of claim 1, further comprising:

a display;

a speaker; and a billing system, wherein the second computing device is further configured to:

output, to the first driver via the first computing device and via the display or the speaker, the first recommendation, and transmit, to the billing system, the first adjustment and a billing code associated with a description of a reason for the first adjustment.

8. The system of claim 1, further comprising:

a third computing device in the second vehicle, the third computing device configured to communicate with the first computing device, wherein one of the first computing device and the second computing device is configured to determine the second driver of the second vehicle, and to determine whether the second driver should be avoided, and wherein the first recommendation comprises a suggestion to avoid the second vehicle.

9. The system of claim 8, wherein the third computing device is further configured to transmit, to the first computing device, at least one of: a name or an identifier associated with the second driver, a telephone number associated with the third computing device, or a license plate number of the second vehicle, and wherein one of the first computing device and the second computing device is configured to determine the second driver of the second vehicle based on at least one of:

the telephone number associated with the third computing device, the name or identifier associated with the second driver, or the license plate number of the second vehicle.

10. A computing device, comprising:

a network interface configured to communicate with one or more mobile devices remote from the computing device; and one or more processors configured to cause the computing device to:

while a first driver is driving a first vehicle, identify a person in proximity to the first driver, wherein the person in proximity to the first driver comprises a passenger of the first vehicle, a second driver of a second vehicle in proximity to the first vehicle, or a passenger of the second vehicle;

retrieve, from a computer-readable storage media, data indicating a driving influence of the identified person;

determine, based on the data indicating the driving influence of the identified person, an influence score related to the identified person;

determine, based on the influence score related to the identified person, a recommendation for the first driver to perform an action;

provide, to a particular mobile device in the first vehicle and among the one or more mobile devices, the recommendation for output to the first driver;

selecting, based on the recommendation and from among a plurality of vehicle sensors of the first vehicle and a plurality of device sensors of the particular mobile device, at least one sensor from which to obtain drive data to evaluate for a reaction of the first driver to the recommendation;

determine, based on the drive data obtained from the selected at least one sensor, the reaction of the first driver to the recommendation;

determine, based on a comparison of the reaction with the action, that the first driver followed the recommendation; and in response to determining that the first driver followed the recommendation:

determine an adjustment to an insurance payment associated with an insurance policy for the first driver; and store, in the computer-readable storage media, the adjustment in association with the insurance policy for the first driver.

11. The computing device of claim 10,
wherein the network interface is configured to receive the drive data from the plurality of vehicle sensors and the plurality of device sensors, wherein the drive data indicates a driving behavior of the first driver.

12. The computing device of claim 11, wherein the recommendation comprises an indication of an amount of the adjustment that the first driver will receive for following the recommendation.

13. A method, comprising:
configuring a computing device with an event manager;
registering the computing device with an event management system;
while a first driver is driving a first vehicle comprising the computing device, identifying a person in proximity to the computing device, wherein the person in proximity to the computing device comprises a passenger of the first vehicle, a second driver of a second vehicle in proximity to the first vehicle, or a passenger of the second vehicle;
retrieving, from a computer-readable storage media, data indicating a driving influence of the identified person;
determining, based on the data indicating the driving influence of the identified person, an influence score related to the identified person;
determining, based on the influence score related to the identified person, a recommendation for the first driver to perform an action;
providing, to the computing device, and while the first driver is driving the first vehicle, the recommendation for the first driver to perform the action;
selecting, based on the recommendation and from among a plurality of vehicle sensors of the first vehicle and a plurality of device sensors of the computing device, at least one sensor from which to collect drive data to evaluate for a reaction of the first driver to the recommendation;
determining, based on the drive data collected from the selected at least one sensor, the reaction of the first driver to the recommendation;
determining, based on a comparison of the reaction with the action, that the first driver followed the recommendation; and in response to determining that the first driver followed the recommendation:

determining an adjustment to an insurance payment associated with an insurance policy for the first driver; and storing, in a computer-readable storage media, the adjustment in association with the insurance policy for the first driver.

14. The method of claim 13,
wherein determining the recommendation comprises:
determining that the second driver is the identified person, and
based on determining that the second driver is deemed dangerous, determining the first driver to perform the action of maintaining a certain distance from the second driver, and
wherein determining the reaction comprises determining, by the event management system, whether the certain distance is maintained based on first global positioning system (GPS) coordinates associated with the first driver and second GPS coordinates associated with the second driver, wherein the first GPS coordinates are included in the drive data collected from the at least one sensor.

15. The method of claim 13,
wherein the recommendation comprises an indication that the first driver will receive a reduction of an automobile insurance premium if the first driver follows the recommendation, and
wherein the determining that the first driver followed the recommendation comprises determining which results of the comparison of the reaction with the action indicate that the first driver followed the recommendation.

16. The system of claim 1, wherein determining the first reaction comprises obtaining the first drive data within a predetermined time from a time that the first recommendation was provided.

17. The system of claim 1, further comprising:
wherein the plurality of vehicle sensors comprises an image sensor, a steering wheel sensor, a brake pedal position sensor, a gas pedal position sensor, or one or more seat sensors,
wherein the plurality of device sensors comprises an accelerometer, a gyroscope, or a global positioning system (GPS) receiver, and
wherein the selecting, based on the first recommendation, the at least one first sensor from which to obtain the first drive data comprises:
when the first recommendation is to accelerate or decelerate the first vehicle, selecting at least one of the accelerometer, the gyroscope, the GPS receiver, the brake pedal position sensor, and the gas pedal position sensor as the at least one first sensor from which to obtain the first drive data,
when the first recommendation is to steer the first vehicle in particular direction, selecting the steering wheel sensor as the at least one first sensor from which to obtain the first drive data,
when the first recommendation is for the first driver to switch seats with the passenger of the first vehicle, selecting the one or more seat sensors as the at least one first sensor from which to obtain the first drive data, and
when the first recommendation is to maintain the first vehicle at a certain distance from the second vehicle, selecting the GPS receiver as the at least one first sensor from which to obtain the first drive data.

18. The system of claim 1,
wherein the plurality of vehicle sensors comprises an image sensor that is configured to capture an image of an environment associated with the first vehicle, wherein the image sensor is connected to the first computing device via at least an on-board diagnostic connector of the first vehicle,
wherein the first computing device transmits the image to the second computing device via the wireless communication system, and
wherein the second computing device identifies the person in proximity to the first driver based on the image.

19. The system of claim 17,
wherein the brake pedal position sensor is configured to determine a position of a brake pedal of the first vehicle,
wherein the brake pedal position sensor is connected to the first computing device via at least an on-board diagnostic connector of the first vehicle,
wherein the first drive data comprises the position of the brake pedal obtained from the brake pedal position sensor, and
wherein the second computing device determines the first reaction to the first recommendation to decelerate the first vehicle, based at least in part on the position of the brake pedal.

20. The computing device of claim 10, wherein the plurality of vehicle sensors comprises an image sensor, a steering wheel sensor, a brake pedal position sensor, a gas pedal position sensor, or one or more seat sensors,
wherein the plurality of device sensors comprises an accelerometer, a gyroscope, or a global positioning system (GPS) receiver, and
wherein selecting, based on the recommendation, the at least one sensor from which to obtain the drive data comprises:
when the recommendation is to accelerate or decelerate the first vehicle, selecting at least one of the accelerometer, the gyroscope, the GPS receiver, the brake pedal position sensor, and the gas pedal position sensor as the at least one sensor from which to obtain the drive data,
when the recommendation is to steer the first vehicle in particular direction, selecting the steering wheel sensor as the at least one sensor from which to obtain the drive data,
when the recommendation is for the first driver to switch seats with the passenger of the first vehicle, selecting the one or more seat sensors as the at least one sensor from which to obtain the drive data, and
when the recommendation is to maintain the first vehicle at a certain distance from the second vehicle, selecting the GPS receiver as the at least one sensor from which to obtain the drive data.

21. The method of claim 13, wherein the plurality of vehicle sensors comprises an image sensor, a steering wheel sensor, a brake pedal position sensor, a gas pedal position sensor, or one or more seat sensors,
wherein the plurality of device sensors comprises an accelerometer, a gyroscope, or a global positioning system (GPS) receiver, and
wherein selecting, based on the recommendation, the at least one sensor from which to collect the drive data comprises:
when the recommendation is to accelerate or decelerate the first vehicle, selecting at least one of the accelerometer, the gyroscope, the GPS receiver, the brake pedal position sensor, and the gas pedal position sensor as the at least one sensor from which to collect the drive data,
when the recommendation is to steer the first vehicle in particular direction, selecting the steering wheel sensor as the at least one sensor from which to collect the drive data,
when the recommendation is for the first driver to switch seats with the passenger of the first vehicle, selecting the one or more seat sensors as the at least one sensor from which to collect the drive data, and
when the recommendation is to maintain the first vehicle at a certain distance from the second vehicle, selecting the GPS receiver as the at least one sensor from which to collect the drive data.

22. The system of claim 1, wherein the second computing device is further configured to store, in the computer-readable storage media, the first drive data in associated with the first driver and the identified person.

* * * * *